(12) United States Patent
Yamamoto

(10) Patent No.: US 6,621,080 B2
(45) Date of Patent: Sep. 16, 2003

(54) APPARATUS FOR MEASURING A MICRO SURFACE CONFIGURATION AND A METHOD FOR MANUFACTURING A PROBE INCORPORATED IN THIS MEASURING APPARATUS

(75) Inventor: Masaki Yamamoto, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/060,365

(22) Filed: Feb. 1, 2002

(65) Prior Publication Data

US 2002/0121601 A1 Sep. 5, 2002

Related U.S. Application Data

(62) Division of application No. 09/233,484, filed on Jan. 20, 1999, now Pat. No. 6,365,895.

(30) Foreign Application Priority Data

Jan. 22, 1998 (JP) .............................. 10-10219
Oct. 29, 1998 (JP) ............................. 10-308164

(51) Int. Cl.[7] .............................................. H01J 37/00
(52) U.S. Cl. ......................................... 250/306; 73/105
(58) Field of Search ................................ 250/306, 307; 73/105; 219/69.12

(56) References Cited

U.S. PATENT DOCUMENTS

| 5,266,801 A | 11/1993 | Elings et al. ................ 250/306 |
| 5,334,835 A | 8/1994 | Nakayama et al. ......... 250/306 |
| 5,559,330 A | 9/1996 | Murashita ................... 250/306 |
| 5,976,347 A | * 11/1999 | Wakabayashi et al. ...... 205/640 |

FOREIGN PATENT DOCUMENTS

| EP | 0587459 | 3/1994 |
| JP | 5-69324 | 3/1993 |
| JP | 5-264214 | 10/1993 |
| JP | 6-201315 | 7/1994 |
| JP | 6-323845 | 11/1994 |
| JP | 8-285512 | 11/1996 |

* cited by examiner

Primary Examiner—Kiet T. Nguyen
(74) Attorney, Agent, or Firm—Louis Woo

(57) ABSTRACT

A probe has a cantilever structure. A piezoelectric element oscillates the probe at or near its resonance frequency. A piezoelectric plate detects a distortion amount of the probe. An actuator adjusts the position of the probe in an oscillating direction so as to stabilize the distortion amount at a constant value. A shifting device adjusts the mutual position between the probe and an objective surface.

7 Claims, 13 Drawing Sheets

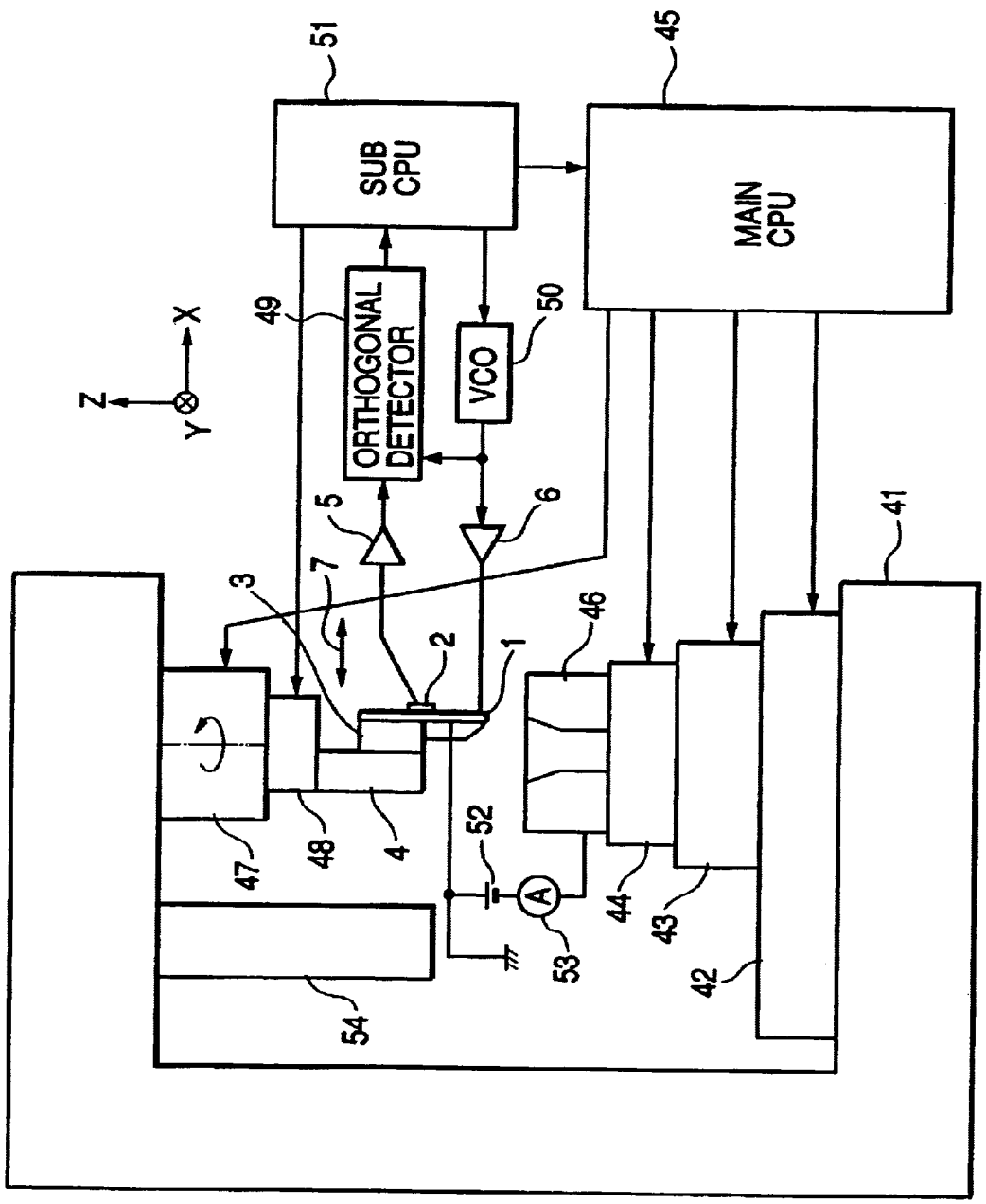

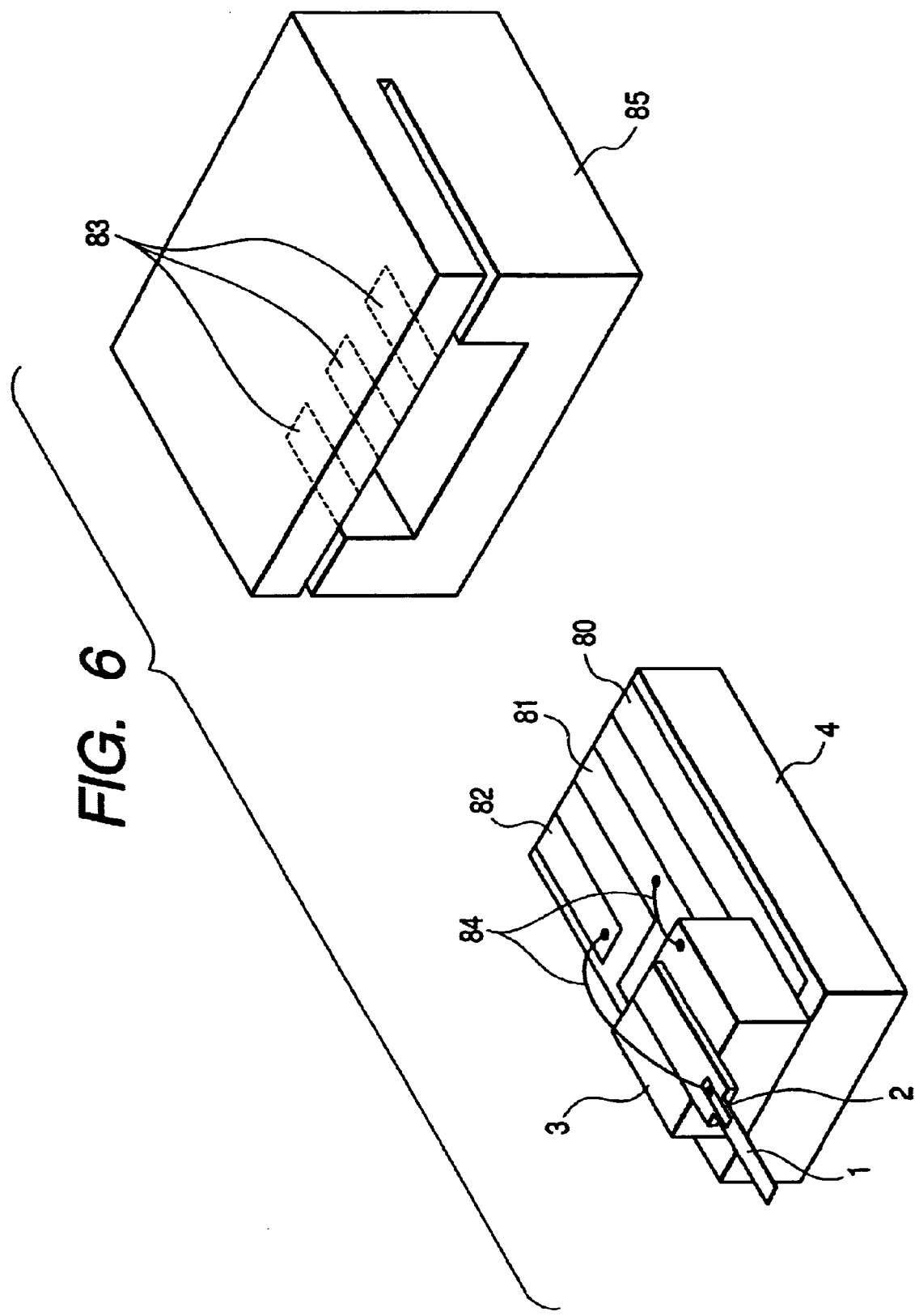

APPARATUS FOR MEASURING A MICRO SURFACE CONFIGURATION AND A METHOD FOR MANUFACTURING A PROBE INCORPORATED IN THIS MEASURING APPARATUS

This is a divisional of application Ser. No. 09/233,484, filed Jan. 20, 1999, now U.S. Pat. No. 6,365,895.

BACKGROUND OF THE INVENTION

The present invention relates to a micro surface measuring apparatus preferably used for measuring a three-dimensional configuration of a machine component in the submillimeter order. For example, this measuring apparatus is applicable to the microstructural measurement for the micro machine parts as well as measurement of an inner surface configuration for the fuel injector nozzles employed in the internal combustion engines or the ink jet nozzles of various printers. More specifically, the present invention relates to a contact-type micro surface configuration measuring apparatus using a probe directly brought into contact with an objective surface to be measured, and also relates to a related method for manufacturing the probe.

The unexamined Japanese patent application No. Kokai 5-264214 or 6-323845 discloses a conventional contact-type micro surface measuring apparatus which is capable of inserting a probe into a narrow or deep portion in a microstructural body or member. Its detailed structure will be explained, hereinafter.

FIG. 15 shows a first conventional arrangement represented by the unexamined Japanese patent application No. Kokai 5-264214. A probe 101, when actuated by an actuator 102, oscillates in a direction shown by an arrow. The probe 101 is placed closely to a measuring object 103. The measuring object 103 is mounted on an X stage 105 which is shiftable in the X-axis direction. The X stage 105 is mounted on a Z stage 104 which is shiftable in the Z-axis direction. The Z stage 104 is connected to and driven by a Z-axis feed mechanism 106. The X stage 105 is connected to and driven by an X-axis feed mechanism 107. A duty cycle measuring device 108, interposed between the probe 101 and the measuring object 103, measures the duty cycle. A computer 109 controls the Z-axis feed mechanism 106, the X-axis feed mechanism 107, and the duty cycle measuring device 108.

According to this arrangement, the actuator 102 causes the probe 101 to oscillate at a predetermined position with a constant amplitude as shown by the arrow in FIG. 15. Electrical conduction between the probe 101 and the measuring object 103 is detectable as short-circuit current measured when a DC voltage is applied between the probe 101 and the measuring object 103. The duty cycle measuring device 108 detects the ratio of a conductive duration to the oscillation period.

For example, when the oscillating probe 101 exceeds a certain displacement "s" as shown in FIG. 16A, the electrically conductive condition is maintained between the probe 101 and the measuring object 103 as shown in FIG. 16B. FIG. 17 shows a relationship between the measured duty cycle and the relative distance between the probe 101 and the measuring object 103. By recording the duty cycle in this manner, the Z-axis feed mechanism 106 is driven to detect the surface configuration of the measuring object 103.

As understood from FIG. 17, the obtained relationship is not completely proportional. It is, however, possible to improve the proportionality when the sine wave in the oscillation of the probe 101 is changed to a triangular wave. When the undulation on the objective surface of the measuring object 103 exceeds the amplitude of the probe 101, the X-axis drive mechanism 107 is controlled to re-position the measuring object 103 for the measurement of the surface configuration of the measuring object 103.

A second conventional arrangement is based on the AFM (scanning-type atomic force microscope) techniques which have been rapidly developed and applicable to the micro configuration measurement. The unexamined Japanese patent application No. Kokai 6-323845 discloses an advanced AFM probe having a simplified structure and applicable to the micro configuration measurement for mechanical parts, whereas many of conventional AFM systems require a large-scale optical system to detect an interatomic force acting on the probe.

FIGS. 18 and 19 show the schematic arrangement of the second conventional arrangement. A probe 201 is made of an elastic filmy plate of $SiO_2$ or the like whose size is 200~300 $\mu$m in length, 40~50 $\mu$m in width, and 1.8 $\mu$m in thickness. A pointed tip 201a, made of ZnO whiskers, is bonded at the distal end of the probe 201.

A piezoelectric film 202b, made of ZnO, is sandwiched between electrodes 202a and 202c and located on the surface of the probe 201. The probe 201 is provided on the surface of a silicon wafer 203. FIG. 19 shows a practical arrangement of a measuring apparatus using the above-described probe 201. A sample 206 is placed on a base body 204 via a Z-axis shift mechanism 205. The probe 201 is attached to the base body 204 via an XYZ piezoelectric scanner 207 and a piezoelectric plate 208 as shown in the drawing.

According to this practical arrangement, the piezoelectric plate 208 causes the probe 201 to oscillate at its resonance frequency. The sample 206 approaches the pointed tip 201a of the probe 201 so closely that the oscillating condition of the probe 201 is significantly influenced by an interatomic force. A distortion signal, detectable by the piezoelectric film 202b, has the amplitude and phase variable in response to the detected oscillation. The position of the XYZ piezoelectric scanner 207 in the Z-axis direction is controlled so as to maintain the changes in the amplitude and phase of the distortion signal, thereby detecting the surface configuration of the sample 206.

The AFM detection mode is roughly classified into a contact mode (tapping mode) and a non-contact mode, as introduced in the journal of society of precision engineering, Vol. 62, No. 3, 1996, pp.345~350. The non-contact mode is a measurement mode preferable in that no damage is given to the surface of the sample. However, an absorbing layer, such as water on the sample surface, gives adverse influence in this measurement mode. Thus, the measurement is performed in the vacuum.

On the other hand, the tapping mode is free from such problems derived from the absorbing layer. The AFM measurement according to this mode is generally performed in the air and is, therefore, applicable to the microconfiguration measurement for many of mechanical parts. FIGS. 20A and 20B cooperatively show the principle of the contact detection in the tapping mode.

In the condition shown in FIG. 20A, the piezoelectric film 202b detects a distortion waveform 211 of the probe 201 whose phase is delayed 90° with respect to the exciting waveform 210 of the probe 201. In the condition shown in FIG. 20B, the pointed tip 201a is brought into contact with the sample 206. In such contact condition, the oscillation of the probe 201 is restricted so as to cause the distortion waveform 211 varied in the amplitude. The configuration of the sample 206 is thus measured based on the amplitude change of the distortion waveform 211. Although not shown in the drawing, it will be possible to detect the configuration of the sample 206 based on the phase change in addition to the amplitude change.

The above-described two conventional measurements are applicable to the configuration measurement of a nozzle hole or a micro groove. However, they have the following problems.

According to the former case represented by the unexamined Japanese patent application No. Kokai 5-264214, the detection of contact condition basically relies on the electrical conduction between the probe 101 and the measuring object 103. Thus, this measuring method is not applicable to the non-conductive members. Furthermore, even if the measuring object is electrically conductive, the measurement accuracy will be deteriorated by oxide films covering the surface or dusts on the surface.

On the other hand, the latter case represented by the unexamined Japanese patent application No. Kokai 6-323845 has the capability of detecting the internal micro configuration regardless of conductiveness of the measuring object.

However, measuring objects are not limited to the ordinary AFM measuring objects, such as semiconductor surfaces or vacuum processed samples. For example, oily or dusty parts will contaminate the AFM probe 201 and render the measurement useless. Hard or rigid parts will abrade the probe 201. The measuring object, when its surface has large undulation, may damage the probe.

SUMMARY OF THE INVENTION

In view of the foregoing problems encountered in the prior art, the present invention has an object to provide a surface configuration measuring apparatus capable of measuring the micro surface configuration of mechanical parts, and also has an object to provide a method for manufacturing the probe used in the surface configuration measuring apparatus.

In order to accomplish the above-described and other related objects, the present invention provides a micro surface measuring apparatus for measuring the configuration of an objective surface. The apparatus comprises a probe having a cantilever structure, an oscillating means for oscillating the probe at or near its resonance frequency, a distortion detecting means for detecting a distortion amount of the probe, a positioning means for adjusting the position of the probe in an oscillating direction so as to stabilize the distortion amount at a constant value, and a shifting means for adjusting the mutual position between the probe and the objective surface.

More specifically, by using the micro electric discharge machining, a cemented carbide (sintered hard alloy) is configured into a probe having a cantilever structure with a pointed tip for measuring the configuration of a measuring object. A piezoelectric ceramic, supporting this probe, causes the probe to oscillate at or near its resonance frequency. When the oscillating pointed tip is brought into contact with the surface of the measuring object, the oscillating probe has the amplitude and phase varying in accordance with the degree of the contact. A piezoelectric ceramic, provided on the probe, produces a distortion signal reflecting the distortion derived from the contact between the probe and the measuring object. The servo positioning of the probe is performed so as to stabilize at least one of the amplitude and the phase of the distortion signal.

The probe is shifted along the surface of the measuring object while maintaining a relative distance between the probe and the measuring object. Thus, the probe moves along the surface of the measuring object. It becomes possible to measure the configuration of the measuring object.

In other words, the present invention realizes a micro surface configuration measuring apparatus capable of stably measuring the surface of a measuring object regardless of its conductiveness, not adversely influenced by the oxide film or dusts on the surface, with a probe which is highly resistive in abrasion, highly stable in shape, and highly durable in corrosion.

The present invention provides a micro surface measuring apparatus for measuring the configuration of an objective surface, the apparatus comprising a probe having a cantilever structure, oscillating means for oscillating the probe at or near its resonance frequency, distortion detecting means for detecting a distortion amount of the probe, positioning means for adjusting the position of the probe in an oscillating direction so as to stabilize the distortion amount at a constant value, and shifting means for adjusting the mutual position between the probe and the objective surface.

With this arrangement, it becomes possible to measure the configuration of the measuring object regardless of its conductiveness, without being adversely influenced by the oxide film or dusts on the surface.

It is preferable that the probe has a pointed tip measuring the configuration of the objective surface and made of a conductive member which is high in hardness.

Furthermore, it is preferable that the probe is made of a cemented carbide which is highly resistive in abrasion, highly stable in shape, and highly durable in corrosion. The configuration measurement for mechanical parts can be stably performed under actual environments.

Furthermore, it is preferable that the probe is partially or entirely made of a diamond or BN (boron nitride) sintered material which is harder than the cemented carbide. This is effective to enhance the resistivity in abrasion and the stability in shape. The configuration measurement for mechanical parts can be stably performed under actual environments.

Furthermore, it is preferable that the probe is manufactured by a micro electric discharge machining. It becomes possible to flexibly form the probe in various shape.

Furthermore, it is preferable that a deteriorated layer formed during the micro electric discharge machining is removed off by the abrasive grain processing. It becomes possible to obtain the probe highly stable in shape.

Furthermore, it is preferable that the oscillating means includes a piezoelectric member supporting the probe. This provides a stable arrangement for supporting the probe stably.

Furthermore, it is preferable that the oscillating means includes a piezoelectric member provided on the probe. This is effective to simplify the probe arrangement.

Furthermore, it is preferable that the distortion detecting means includes a piezoelectric member provided on the probe. With this arrangement, it becomes possible to measure the oscillating condition of the probe at the position where the oscillatory distortion is maximized. The oscillating condition can be measured with high accuracy.

Furthermore, it is preferable that the distortion detecting means includes a strain gauge provided on the probe.

Furthermore, it is preferable that the displacement of the probe is adjustable so as to stabilize a phase variation and/or an amplitude variation based on the comparison between a signal obtained from the distortion detecting means and a drive signal of the oscillating means. This realizes a quick and smooth feedback or servo control for positioning the probe. The stable configuration measurement can be realized.

Furthermore, it is preferable that a voltage is applied between the probe and the objective surface to detect electric characteristics of the objective surface based on a current value measured between the probe and the objective surface.

Furthermore, it is preferable that the probe and the objective surface are magnetic members, and the probe includes a coil to detect the magnetic characteristics of the objective surface based on a magnetic flux density modified in accordance with the oscillation of the probe.

Another aspect of the present invention provides a method for manufacturing a probe comprising the steps of adding a distortion detecting member on a platelike beam material, machining the platelike beam material into a predetermined beam structure, and removing a deteriorated layer from the resultant beam structure. With this manufacturing method, it becomes possible to measure the configuration of the measuring object regardless of its conductiveness without being adversely influenced by the oxide film or dusts on the surface.

Furthermore, it is preferable in the above-described probe manufacturing method that the adding step of the distortion detecting member includes the steps of bonding a piezoelectric member on the platelike beam material and machining the bonded piezoelectric member into a predetermined configuration.

Furthermore, it is preferable in the above-described probe manufacturing method that the adding step of the distortion detecting member on the platelike beam material includes the steps of forming a piezoelectric thin film on the platelike beam material and machining the piezoelectric member into a predetermined configuration during or after the formation of the piezoelectric thin film.

Furthermore, it is preferable in the above-described probe manufacturing method that the machining step of the platelike beam material into the predetermined beam structure is performed by a micro electric discharge machining. It becomes possible to flexibly form the probe in various shape.

Furthermore, it is preferable in the above-described probe manufacturing method that the removing step of the deteriorated layer from the resultant beam structure is performed by the abrasive grain processing.

BRIEF DESCRIPTION OF THE DRAWINGS

The above and other objects, features and advantages of the present invention will become more apparent from the following detailed description which is to be read in conjunction with the accompanying drawings, in which:

FIG. 5 is a schematic view showing the arrangement of a micro surface configuration measuring apparatus incorporating the probe shown in FIG. 1;

FIG. 6 is a view showing the method for installing the probe into a socket of the micro surface configuration measuring apparatus;

DESCRIPTION OF THE PREFERRED EMBODIMENTS

Figure 1:
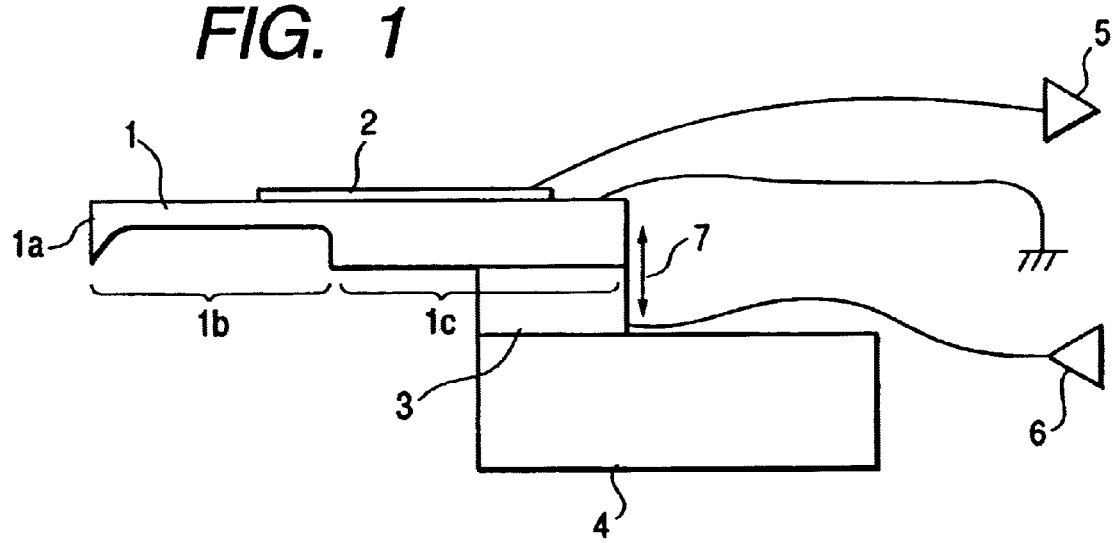
FIG. 1 is a schematic view showing a probe arrangement in accordance with a preferable embodiment of the present invention.

Preferred embodiments of the present invention will be explained in more detail with reference to the accompanying drawings. Identical parts are denoted by the same reference numerals throughout the drawings.

FIG. 1 is a side view showing the probe arrangement in accordance with a preferable embodiment of the present invention. A probe 1 is configured into a stepped cantilever arrangement, with a pointed tip 1a at its distal end. The probe 1 has a beam portion 1b and a proximal portion 1c integrally arranged from the pointed tip 1a in this order. A piezoelectric plate 2 extends along the upper surface of the probe 1 in the region from the beam portion 1b to the proximal portion 1c. The probe 1 is supported on a support table 4 via a piezoelectric element 3 which is provided below the proximal portion 1c.

A distortion amount of the piezoelectric plate 2 is detectable through a preamplifier 5. A high-voltage amplifier 6 drives the piezoelectric element 3 fixed on the support table 4. The probe 1 oscillates in an oscillating direction 7. The oscillation frequency is substantially identical with the resonance frequency of the beam portion 1b of the probe 1. The piezoelectric plate 2 detects the oscillation of the beam portion 1b.

According to this arrangement, the pointed tip 1a of the probe 1 approaches the objective surface of a measuring object so closely that they are brought into contact with each other at periodic intervals. By detecting a reduced amplitude or a changed phase of the oscillation, the configuration of the objective surface of the measuring object can be detected according to the principle of the AFM tapping mode.

The probe 1 is made of a cemented carbide (sintered hard alloy) so that the piezoelectric element 3 can effectively resonate the probe 1. At the room temperature, the cemented carbide is very hard, anti-frictional, highly elastic, and anti-corrosive. Thus, the properties of the cemented carbide is suitable for the probe used for measuring the configuration of the measuring object.

The cemented carbide is generally difficult to machine due to its hardness. However, to solve this problem, the present invention adopts a micro electric discharge machining. As the cemented carbide is a sintered member, it is not subjected to the deformation processing or plastic working. This is preferable in that the cemented carbide has a small or negligible internal stress and is applicable to the micro machining. Needless to say, it is possible to manufacture a comparable probe from an appropriate member other than the cemented carbide. For example, the cemented carbide can be replaced by a tool steel or a thermet which is also used as a tool material, or by a stainless steel or other metallic (e.g., tungsten) materials. However, when any of these substitutional materials is used, the configuration measurement may be influenced by its anti-frictional or anti-corrosive properties which are inferior to those of the cemented carbide.

FIGS. 2A to 2E are views showing practical processes for manufacturing the probe 1 by using the micro electric discharge machining. First, in FIG. 2A, a thin plate material 1', serving as the probe 1, is 200 μm in thickness, 10 mm in length and 2 mm in width. This thin plate material 1' is formed by grinding a cemented carbide.

Another thin plate material 2', serving as the piezoelectric plate 2, has a thickness of 20~30 μm. The thin plate material 2' is formed by sintering the green sheet of PZT. The area of the thin plate material 2' is substantially identical with that (10 mm×2 mm) of the thin plate material 1'. Although not shown in the drawing, silver electrodes are formed on the opposed surfaces of the thin plate material 2'. The thin plate material 2' of the piezoelectric plate 2 is securely bonded on the surface of the thin plate material 1' of the probe 1 by using an electrically conductive adhesive.

Figure 2A:
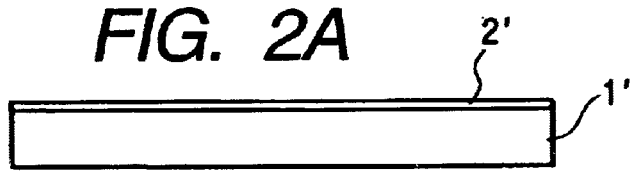
FIGS. 2A to 2E are views illustrating the manufacturing processes of the probe shown in FIG. 1.
Figure 2B:
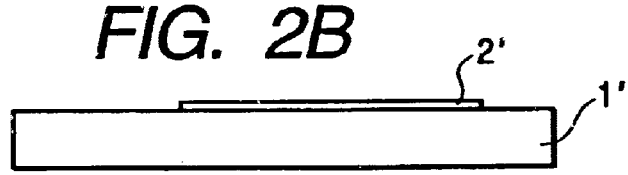

Next, as shown in FIG. 2B, only the thin plate material 2' is processed by the dicing machine to have a thickness of 50 μm. More specifically, by precisely adjusting the cutting depth of the grindstone, only the thin plate material 2' is planed while the cemented carbide plate is left without being processed. The reason why the piezoelectric plate 2 needs to be processed independently prior to the machining of the cemented carbide plate is that the piezoelectric plate 2 cannot be processed by the micro electric discharge machining due to its non-conductiveness.

Figure 2D:
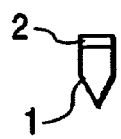
Figure 2C:
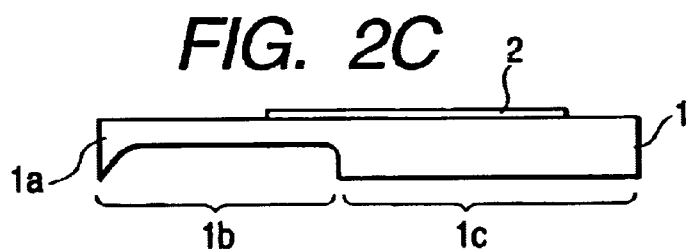
Figure 2E:
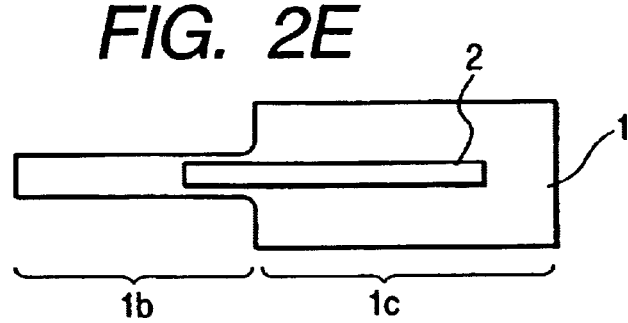

Next, as shown in FIG. 2C, the thin plate material 1' is processed by the micro electric discharge machining into the probe 1 with the pointed tip 1a at its distal end and the beam portion 1b. The pointed tip 1a has a sharp edge with the curvature radius of approximately 1 μm, configured by the micro electric discharge machining. FIG. 2D is a left side view showing the fabricated probe 1 with the piezoelectric plate 2. FIG. 2E is a plan view showing the fabricated probe 1 with the piezoelectric plate 2. The beam portion 1b is so thin that it can be inserted in an inside space of a microstructural member. For example, the width of the beam portion 1b is 70 μm. The proximal portion 1c is wider than the beam portion 1b so that the proximal portion 1c can be easily installed on the support table 4 via the piezoelectric element 3. For example, the width of the proximal portion 1c is 2 mm.

The thickness of the beam portion 1b is 50 μm. While the thickness of the proximal portion 1c is 500 μm. In the bending rigidity, there is a large difference equivalent to three digits between the beam portion 1b and the proximal portion 1c. In other words, the beam portion 1b can be regarded as a cantilever. The resonance frequency of the bending vibration occurring in the cantilever is expressed by the following equation.

$$f_n = \frac{1}{2\pi} \frac{a_n^2}{l^2} \sqrt{\frac{EI}{m_l}} \quad (a_1 = 1.875, a_2 = 4.694, a_3 = 7.855 \ldots) \quad (1)$$

$$I = \frac{1}{12} bh^3 \quad (2)$$

$$m_l = \rho hb \quad (3)$$

In the above equations, $a_n$ represents a coefficient variable in accordance with the order of the oscillation, I represents an areal second moment of the beam portion 1b, and $m_l$ represents the mass of the beam portion 1b per unit length. From the above, the primary resonance frequency $f_1$ of the beam portion 1b can be simply expressed by using the width b, the thickness h and the length l of the beam portion 1b and the Young's modulus E and the density ρ of the beam material.

$$f_1 = \frac{0.16h}{l^2} \sqrt{\frac{E}{\rho}} \quad (4)$$

The probe 1 may be completely made of a cemented carbide whose Young's modulus is $6.4 \times 10^2$ Gpa and the density ρ is $1.4 \times 10^3$ kg/m³. In this case, the primary resonance frequency $f_1$ becomes 24 kHz when the length of the beam portion 1b is 1.5 mm.

Figure 3:
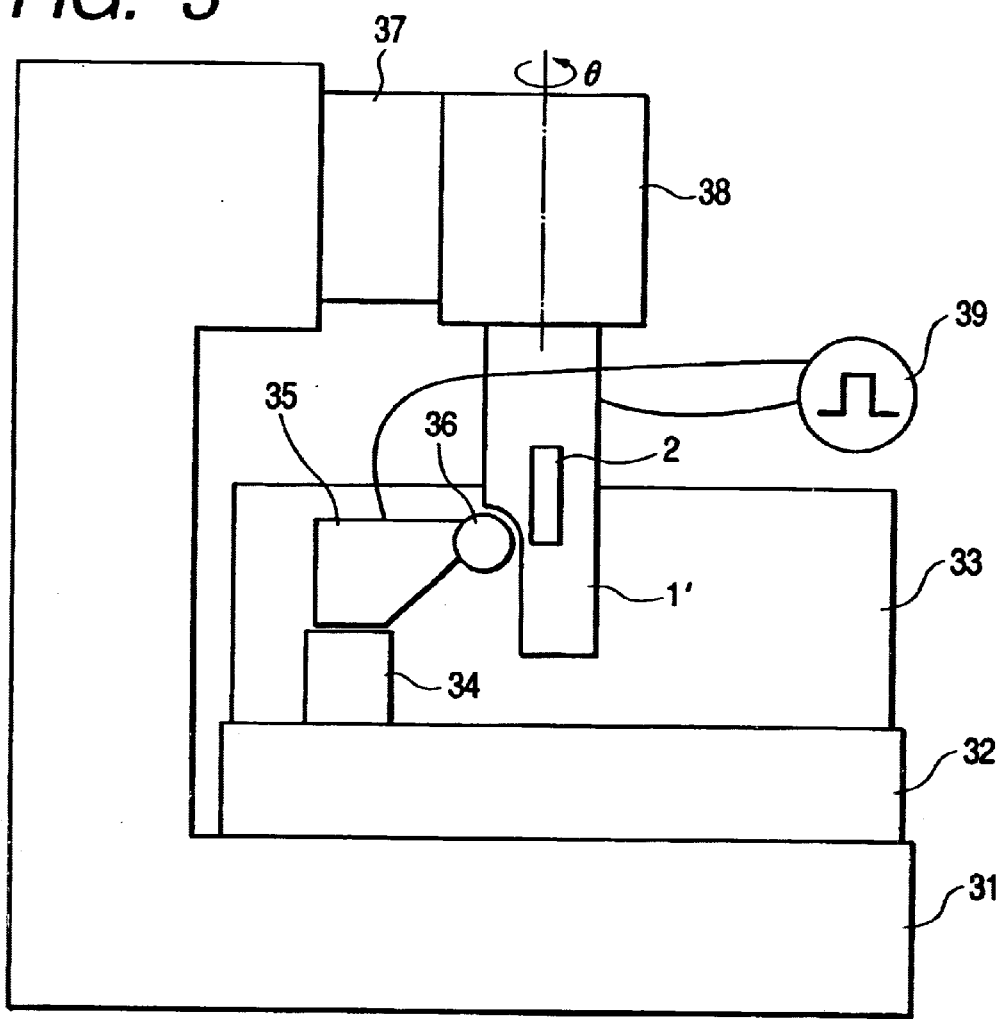
FIG. 3 is a schematic view showing the arrangement of a micro electric discharge machining apparatus used in the manufacturing of the probe shown in FIG. 1.

FIG. 3 shows the micro electric discharge machining apparatus which performs the machining processes explained with reference to FIGS. 2A to 2E. The micro electric discharge machining apparatus shown in FIG. 3 is based on the model MG-ED (commercially available from Matsushita Electric Industrial Co., Ltd.).

In FIG. 3, the apparatus comprises a base 31, an XY stage 32 mounted on the base 31, a machining tank 33 mounted on the XY stage 32. The machining tank 33 stores the machining fluid. The machining tank 3 is provided with a wire guide 35 mounted on a support 34. A brass wire 36, which is 100 μm in diameter and held at the distal end of the wire guide 35, serves as an electrode for machining the thin plate material 1' into the probe 1.

The probe 1 is partly dipped into the machining fluid stored in the machining tank 33. The portion to be processed is disposed adjacent to the wire 36. The base 31 supports the probe 1 via a Z stage 37 and a rotary table 38. In this condition, the thin plate material 2' of the piezoelectric plate 2, mounted on the thin plate material 1' of the probe 1, is already machined in the predetermined shape. A power source 39 is connected between the thin plate material 1' and the wire 36 held on the wire guide 35.

According to this arrangement, to perform the electric discharge machining, a voltage of the power source 39 is applied to a gap between the thin plate material 1' and the wire 36. The wire 36 wears significantly due to the electric discharge energy during the machining of the thin plate material 1'. Thus, there is a mechanism (not shown) for continuously shifting the wire 36 in a direction normal to the sheet of FIG. 3 so that the portion of the wire 36 subjected to the electric discharge is always new. Thus, the electric discharge machining is performed according to the so-called WEDG method which attains the machining accuracy of a sub $\mu$m level.

Then, the rotary table 38 accurately adjusts the angle of the thin plate material 1' in accordance with advancement of the electric discharge machining. The XY stage 32 and the Z stage 37 cooperate to adjust the positional relationship between the thin plate material 1' and the wire 36 during the electric discharge machining. This arrangement makes it possible to completely automate the above-described processes of FIGS. 2C to 2E which require the complicated three-dimensional machining.

The electric discharge machining basically utilizes the thermal energy of S electric discharge to remove or cut the material. Thus, in the micro electric discharge machining, a deteriorated layer 1" remains on the processed material. When the cemented carbide is processed by the electric discharge machining, the processed surface of the cemented carbide usually lacks the bonding phase because the Co metal in the bonding phase has a low melting point while the WC powders serving as the main material have a high melting point. In this deteriorated condition, the WC powders are easily removed off the processed surface. If such a cemented carbide with a deteriorated surface is directly used for the probe 1, the pointed tip of the probe 1 will be deformed during the measurement. This results in errors in the measurement.

Figure 4:
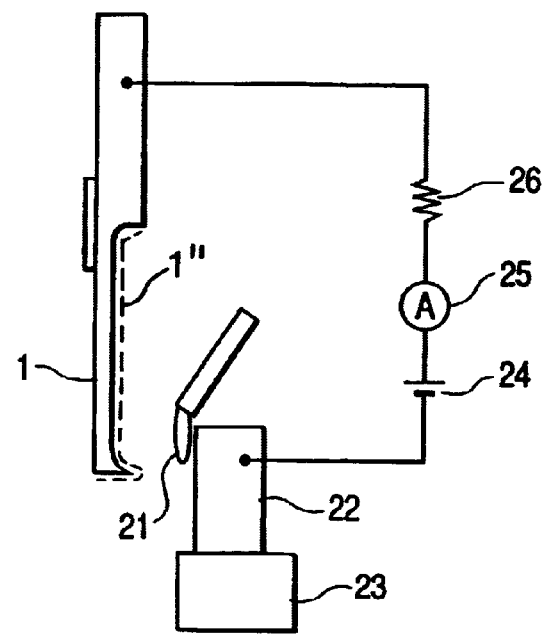
FIG. 4 is a schematic view showing the arrangement of an abrasive grain processing apparatus used in the manufacturing of the probe shown in FIG. 1.

To effectively remove the deteriorated layer 1" off the processed surface of the plate 1, the plate 1 is brought into contact with the surface of a metallic wear plate 22. A slurry 21 containing abrasive grain is applied on the surface of the wear plate 22 as shown in FIG. 4. To cause a relative motion between the wear plate 22 and the probe 1, an oscillation generator 23 can generate the oscillatory movement of 50 Hz in frequency and 5 $\mu$m in amplitude in an arbitrary direction. The wear plate 22 is made of a relatively soft material, such as tin or copper. Although not shown in the drawing, there is a mechanism for positioning the probe 1 with respect to the wear plate 22. A current detecting circuit, including a DC power source 24, an ammeter 25, and a resister 26, is connected between the probe 1 and the wear plate 22 to detect the contact condition between the probe 1 and the wear plate 22. The positioning mechanism performs the positioning operation for the probe 1 in accordance with the current value measured by the ammeter 25.

Hereinafter, details of the configuration measurement using the manufactured probe 1 will be explained. FIG. 5 is a schematic view showing an overall arrangement of the micro surface configuration measuring apparatus equipped with the probe 1. In FIG. 5, a base 41 mounts an X stage 42, a Y stage 43, and a Z stage 44 in this order. A main CPU 45 controls these stages 42 to 44. A measuring object 46 is placed on the top of the stacked stages 42 to 44 so that it is shiftable in a three-dimensional space.

The accuracy in the positioning the stages 42 to 44 directly leads to the error in the configuration measurement. This embodiment uses a built-in linear scale for accurately managing the position of each stage. The main CPU 45 controls a rotary table 47 provided at an upper portion of the base 41.

An actuator 48 is attached to the rotary table 47. The probe 1 with the piezoelectric plate 2 is attached to the actuator 48 via the support table 4 and the piezoelectric element 3. The actuator 48 moves in the direction 7 identical with the oscillating direction of the piezoelectric element 3. The accuracy of the actuator 48 in the positioning operation is in the order of $\frac{1}{100}\mu$m. Its dynamic range is as wide as the movable range of 100 $\mu$m. The arrangement of this embodiment comprises both the piezoelectric element and a displacement enlargement mechanism. As the actuator 48 is attached to the rotary table 47, the oscillating direction 7 of the probe 1 is variable in 360°.

The roundness of the rotary table 47 gives influence to the error in the configuration measurement. To minimize the error, the rotary table 47 uses an air bearing which is highly accurate. A signal, representing a distortion of the piezoelectric plate 2, is sent from the piezoelectric plate 2 to a sub CPU 51 via the preamplifier 5 and an orthogonal detector 49. The sub CPU 51 generates a command voltage signal sent to the piezoelectric element 3 via a VCO 50 and the high-voltage amplifier 6. In response to this drive signal, the piezoelectric element 3 causes the oscillatory movement.

The sub CPU 51 not only controls the actuator 48 but also sends a signal to the main CPU 45. The signal generated from the VCO 50 is sent to the orthogonal detector 49, too.

Furthermore, in the micro configuration measurement, it is generally difficult to shift the probe 1 to a measuring point on the measuring object 46 by simply relying on the naked eyes. This is why a microscope 54 is equipped for the alignment. The measuring object 46 is shifted under the microscope 54 by the X stage 42 so that the coordinates of the measuring point can be measured through the microscopic screen displaying the measuring object 46. Using the measured coordinates, the measuring point can be accurately positioned under the probe 1.

According to this embodiment, the above-described micro surface configuration measuring apparatus operates in the following manner.

First, the VCO 50 generates a constant frequency signal based on the command voltage signal fed from the sub CPU 51. The constant frequency signal is sent to the piezoelectric element 3 via the high-voltage amplifier 6. The piezoelectric element 3 oscillates in the direction 7. This oscillatory movement is transmitted to the probe 1. In response to the vibration transmitted to probe 1, the piezoelectric plate 2 produces the distortion signal which is entered into the orthogonal detector 49 via the preamplifier 5.

The orthogonal detector 49 measures a phase shift between the distortion signal and the output signal of the VCO 50. The measured phase shift is sent to the sub CPU 51. In this case, the output frequency of the VCO 50 is set to a predetermined value so that the probe 1 can cause the resonant oscillation. In other words, the 90° phase difference is provided between the output signal of the preamplifier 5 and the output signal of the VCO 50. The resonance frequency, being set in this embodiment, is approximately 25 kHz. When any variation is found in the command voltage signal supplied to the VCO 50, it reflects the contact condition of the probe 1.

Alternatively, it is possible to set the output frequency of the VCO 50 at a predetermined value so that the probe 1 can cause the resonant oscillation, and the sub CPU 51 records the phase relationship or an amplitude ratio between the output signal of the preamplifier 5 and the output signal of the VCO 50. In this case, any change in the phase and/or amplitude reflects the contact condition of the probe 1.

The amplitude of the oscillation is approximately 100 nm at the distal end of the probe 1. As the probe 1 is regarded as a cantilever, it is possible to estimate the contact pressure of the probe 1 based on the amplitude measured at the distal end thereof. More specifically, the following equation defines a force f that needs to be applied to the distal end of a cantilever to cause a distortion δ statically at this distal end.

$$f = \frac{3EI}{l^3} \delta \tag{5}$$

When the probe 1 is made of a cemented carbide and the beam portion 1b is 1.5 mm in length, 50 μm in thickness, and 70 μm in width, the force f required for causing a distortion of 100 nm is approximately 3 mg. Under such a small contact pressure, filmy water existing on the surface of the measuring object may cause a measuring error due to its surface tension. To eliminate this error, an appropriate arrangement (not shown) is provided for supplying dry air to the surface of the measuring object so as to remove the water or moisture component from the surface of the measuring object.

When the probe 1 is brought into contact with the measuring object 46 through the positioning operation using the stages 42 to 44, the condition of the probe 1 slightly deviates from the resonant oscillation. This deviation is detectable as an output of the orthogonal detector 49 and is sent to the sub CPU 51.

The sub CPU 51 controls the actuator 48 to correct or eliminate this deviation. Through such a feedback or servo control, the probe 1 can be always shifted along the surface of measuring object 46 while maintaining a negligible clearance therebetween. Thus, the configuration of the measuring object is detectable from the composite movement resulting from the three-dimensional motion of the stages 42 to 44 and the rotational motion of the actuator 48 mounted on the rotary table 47.

The signal sent from the sub CPU 51 to the main CPU 45 is a signal representing the position of the actuator 48. As the main CPU 45 manages all of the position data of the stages 42 to 44 and the rotary table 47, it is possible for the main CPU 45 to perform necessary calculations based on the position data and display the measuring result.

The apparatus shown in FIG. 5 includes a current detecting circuit comprising a DC power source 52 and an ammeter 53. Although it is dispensable for the configuration measurement, providing this circuit makes it possible to know the electric properties of the objective surface, such as local oxidation, dirt or stain, or locally deteriorated conductivity, based on the current measured by the ammeter 53. This electric measurement can be done simultaneously with the configuration measurement.

For example, it becomes possible to detect the non-conductive deposit contained in a metallic part, the abrasive grain sunk into the workpiece during the grinding operation, or the oxidation film partly formed on the metal surface.

Furthermore, besides the measurement of the electric properties, it is possible to measure the magnetic properties simultaneously with the configuration measurement. For example, it is assumed that the measuring object 46 is made of a magnetic member. In this case, a magnetic circuit is formed between the measuring object 46 and the probe 1 which is a ferromagnetic substance. It is preferable to provide a coil wound around the proximal portion 1c of the probe 1. The magnetic flux, when modified by the oscillation of the probe 1, can be measured by this coil. If the ferromagnetism of the probe 1 gives adverse influence to the measurement, it will be possible to obtain a non-magnetic probe by modifying the material of the bonding phase of the cemented carbide.

FIG. 6 shows the method for installing the probe to the micro surface configuration measuring apparatus. The probe, used in the micro surface measuring apparatus of this embodiment, is a mechanical cantilever whose length is limited within a certain range in view of the strength in comparison with its thickness. In general, the probe needs to be thin and short enough for measuring a thin hole, on the other hand, needs to be thick and long enough for measuring a deep place. Hence, a plurality of probes are prepared beforehand and selectively used in accordance with the measuring object. Therefore, it is important to provide a simplified attaching and/or detaching arrangement for exchanging the probes.

In FIG. 6, the support table 4 is a ceramic flat plate. Electrodes 80, 81 and 82 are formed on the upper surface of this support table 4. The electrode 80 is directly connected to a lower electrode (not shown) of the piezoelectric element 3. To drive the piezoelectric element 3, electric power is supplied to the electric electrode 80. The electrode 81 is grounded to maintain an upper electrode (not shown) of the piezoelectric element 3 and the probe 1 at a ground potential. The electrode 82, connected to the piezoelectric plate 2, serves as an output terminal of the distortion signal obtained from the piezoelectric plate 2. A socket 85 has a receiving bore which faces downward when the socket 85 is fixed to the actuator 48 of the micro surface configuration measuring apparatus. The probe 1 is attached to the socket 85 by inserting the support table 4 into the receiving bore of the socket 85. The electrodes 80, 81 and 82 formed on the surface of the support table 4 are brought into contact with corresponding electrodes 83 formed in the receiving bore when the support table 4 is completely engaged with the socket 85. Thus, the electrodes 80, 81 and 82 are electrically connected to other electric components of the micro surface configuration measuring apparatus. The socket 85 is equipped with a lock mechanism (not shown) for securely holding the support table 4.

The manufacturing cost of the probe may not be low according to the manufacturing method disclosed in the above-described embodiment, because this manufacturing method includes the bonding of the piezoelectric material onto the probe material as well as the machining of both the piezoelectric material and the probe member. The following embodiment provides a non-expensive manufacturing method.

Figure 7A:
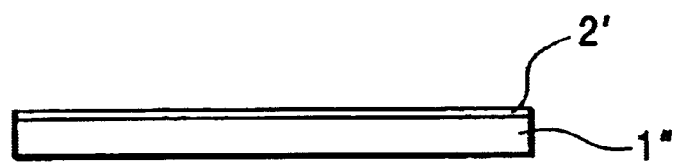
FIGS. 7A to 7D are views illustrating another manufacturing method of the probe in accordance with the present invention.
Figure 7B:
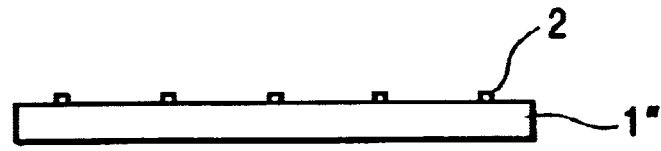

First, as shown in FIG. 7A, a prepared probe material 1" is grinding finished. This probe material 1" is 0.2 mm in thickness and has a square shape of 20 mm×20 mm. A piezoelectric plate material 2', having substantially the same size as that of the probe material 1", is bonded on the surface of the probe material 1" in a face-to-face relationship. Silver electrodes (not shown) are formed on opposed surfaces of the piezoelectric plate material 2'. The bonded unit of the materials 1" and 2' is then configured into the shape shown in FIG. 7B through the sand blasting. A plurality of piezoelectric plates 2 are formed on the surface of the probe material 1". According to the sand blasting, abrasive grain is accelerated by the pressurized air. During the sand blasting, the piezoelectric plate is subjected to the pressurized air. To prevent the piezoelectric plate 2 from removing off the probe material 1" due to the pressurized air, having a low aspect ratio is preferable. In this respect, the minimum pattern size of the piezoelectric plate 2 is 200 μm.

Figure 7C:
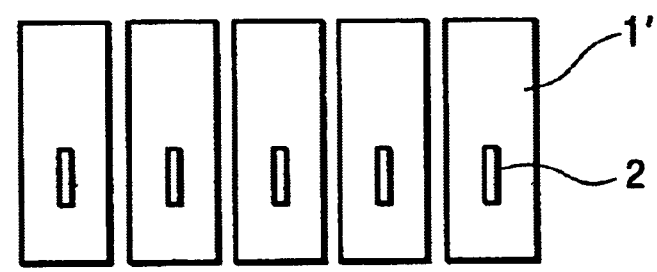

FIG. 7C is a plan view showing a plurality of divided probe materials 1' which are obtained by cutting the probe material 1" by the wire cut electric discharge machining. One piezoelectric plate 2 is mounted on each divided probe material 1'.

Figure 7D:
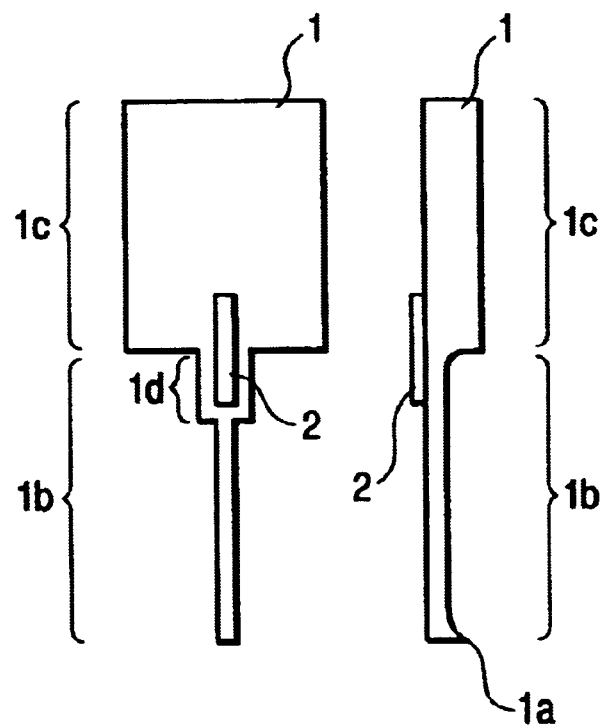

The succeeding machining processes are identical with those explained with reference to FIG. 2, and performed so as to obtain the probes one after another. The piezoelectric plate 2 processed by the sand blasting has a width of 200 μm which is wider than that of the piezoelectric plate 2 processed by the dicing. As shown in FIG. 7D, the probe 1 has a wide portion 1d as part of the beam portion 1b. As expressed by the equation 4, the length 1 and the thickness h of the probe 1 are the parameters determining the resonance frequency of the probe 1. However, the width b has no influence to the resonance frequency. Accordingly, providing the wide portion 1d gives no adverse influence to the properties of the probe 1.

As described above, this embodiment makes it possible to perform the bonding process, the sandblasting, and the wire cut electric discharge machining for forming numerous probes. Thus, 10 to 20 probes can be batch processed at a time. This improves the manufacturing efficiency. However, the processes shown in FIGS. 7D and 7E need to be done independently for each probe by using the micro electric discharge machining. This may be advantageous in that numerous kinds but small number of probe configurations can be provided to satisfy various measuring requirements from the users.

The present invention provides various probe arrangements.

Figure 8A:
FIGS. 8A and 8B are views showing another probe arrangement in accordance with the present invention.
Figure 8B:
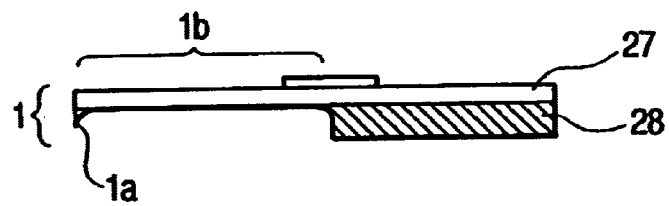

FIG. 8A is a side view showing the probe material 1' of the probe 1. FIG. 8B is a side view showing the accomplished shape of the probe 1 fabricated from the probe material 1'. The probe material 1' comprises a cemented carbide 27 and a diamond layer 28 which are stacked and sintered together. Like the cemented carbide 27, the sintered diamond layer 28 has a bonding phase of cobalt. Thus, the electric discharge machining is preferably applied on the sintered diamond layer 28 to fabricate the probe 1 by using the method explained with reference to FIGS. 2A~2E or 7A~7D. As shown in FIG. 8B, the fabricated probe 1 has a pointed tip 1a made of a sintered diamond. As a result, the pointed tip 1a has excellent anti-frictional property which is superior to that of the cemented carbide. The life of the probe can be extended greatly. The sintered diamond layer can be replaced by a sintered BN (boron nitride) having the metallic bonding phase. Although the beam portion 1b is made of the cemented carbide 27, it is possible to use a beam portion 1b made of a sintered diamond material. In this case, the beam portion 1b may have poor durability against an impact force. It is thus preferable that the probe has a sufficient thickness.

Figure 9A:
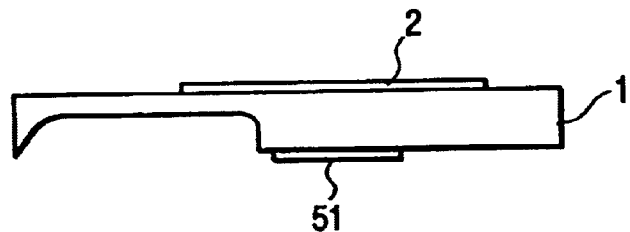
FIGS. 9A and 9B are views showing another probe arrangement in accordance with the present invention.
Figure 9B:
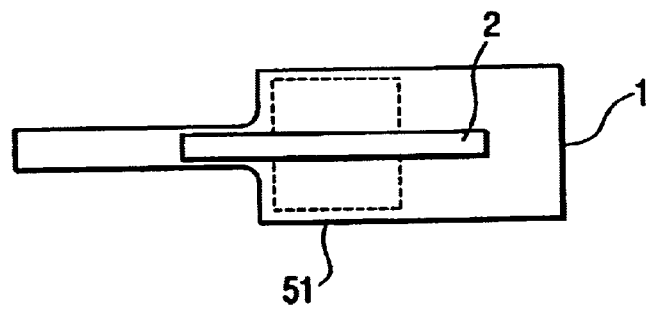

FIG. 9A is a side view showing another arrangement of the probe 1. FIG. 9B is a plan view showing the same. According to this arrangement, a second piezoelectric plate 51 is bonded on a reverse surface of the probe 1. The second piezoelectric plate 51 is a substitute for the piezoelectric element 3. In other words, the piezoelectric element 3 can be omitted. Needless to say, it is possible to dispose the second piezoelectric plate 51 at both sides of the piezoelectric plate 2 instead of placing it on the reverse surface.

By adopting this arrangement, the piezoelectric element 3 can be removed from the measuring loop. It is effective to prevent any measuring errors derived from the shape drift or thermal deformation of the piezoelectric element 3.

Figure 10:
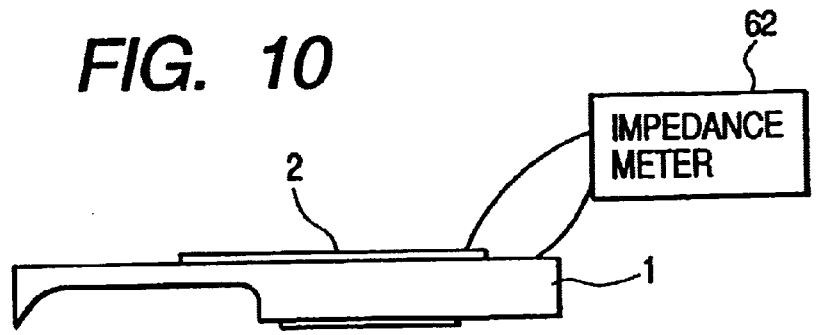
FIG. 10 is a view showing another probe arrangement in accordance with the present invention.

As shown in FIG. 10, to eliminate measuring errors derived from the piezoelectric element 3, it is possible to use the piezoelectric plate 2 itself as a means for oscillating the probe 1. According to this arrangement, the piezoelectric plate 2 is connected to an impedance meter 62 to read the change in the impedance value which reflects the contact condition of the oscillating probe 1. However, according to this arrangement, the measuring sensitivity may deteriorate when the piezoelectric plate 2 is downsized with a thin thickness. Thus, it is preferable that the piezoelectric plate 2 has an area larger than 1 mm$^2$.

Figure 11A:
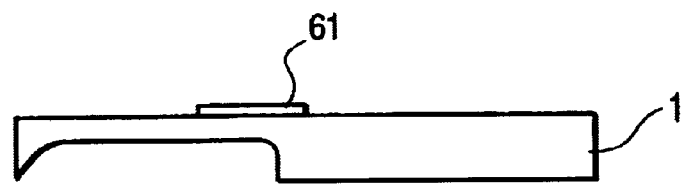
FIGS. 11A and 11B are views showing another probe arrangement in accordance with the present invention.
Figure 11B:
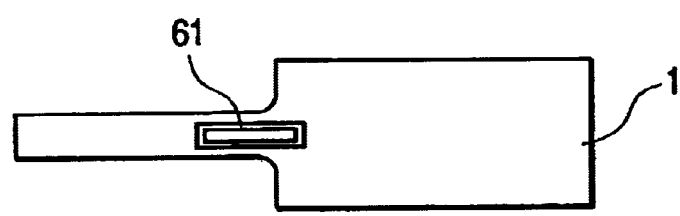

FIG. 11A is a side view showing another arrangement of the probe 1. FIG. 11B is a plan view of the same. According to this arrangement, the piezoelectric plate 2 is replaced by a strain gauge 61. The strain gauge 61 has substantially the same function as that of the piezoelectric plate 2.

Figure 12A:
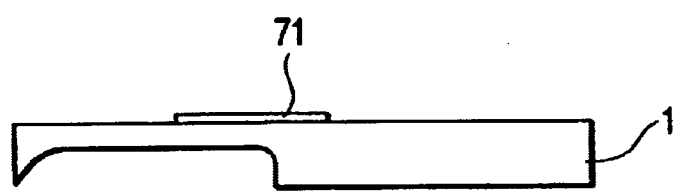
FIGS. 12A and 12B are views showing another probe arrangement in accordance with the present invention.
Figure 12B:
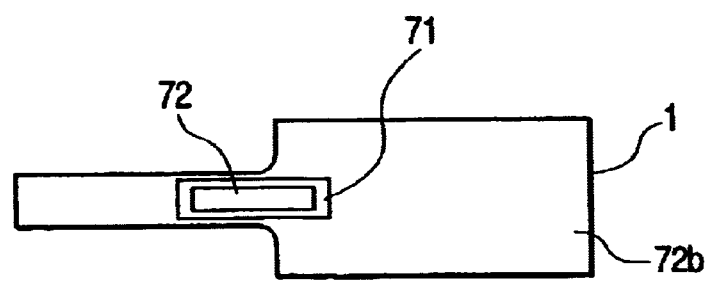

The strain gauge 61 may be a metallic type or a semiconductor type. FIG. 12A is a side view showing another arrangement of the probe 1. FIG. 12B is a plan view of the same. According to this arrangement, a piezoelectric thin film 71 is formed on a surface of the probe 1. The piezoelectric thin film 71 has substantially the same function as that of the piezoelectric plate 2.

The piezoelectric thin film 71 can be manufactured by using the sol-gel method, introduced by K. R. Udayakumar et al. in FERROELECIRIC THIN FILM ULTRASONIC MICROMOTORS, IEEE, 1991 or by using the sputtering method introduced by T. KAMADA et al. in Mat. Res. Soc. Syp. Proc. Vol. 433, pp377 (1996).

More specifically, the lapping is applied on the surface of the probe 1 made of a cemented carbide to improve the surface roughness. A Pt/Ti layer is formed on the finished surface of the probe 1. Then, the piezoelectric thin film 71 is formed on the Pt/Ti layer. Then, the etching is applied on the piezoelectric thin film 71 to leave the necessary portion. Then, a distortion detecting electrode 72 is formed on the piezoelectric thin film 71 for detecting the distortion.

The thickness of the piezoelectric thin film 71 is 1~3 μm at maximum. There are some merits which are not obtained when the bulky piezoelectric plate 2 is used. First, as the thickness of the piezoelectric thin film 71 is sufficiently thin compared with that of the probe 1, it becomes possible to prevent the probe from bending due to the bimorph effect induced by a thermal expansion difference between them. Furthermore, the pattern forming by the etching makes it possible to reduce the thickness of the piezoelectric thin film to the level of 10 μm. This is effective in miniaturizing the probe. Furthermore, this arrangement does not require the electrically conductive adhesive which is used in the above-described embodiment for bonding the bulky piezoelectric plate 2. The internal damping with respect to the vibration is reduced, while the Q value in the resonance of the probe is increased. Thus, the sensitivity in the detection of the probe can be improved.

Figure 13A:
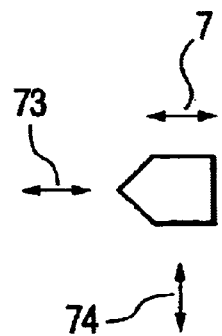
FIGS. 13A and 13B are views showing another probe arrangement in accordance with the present invention.
Figure 13B:
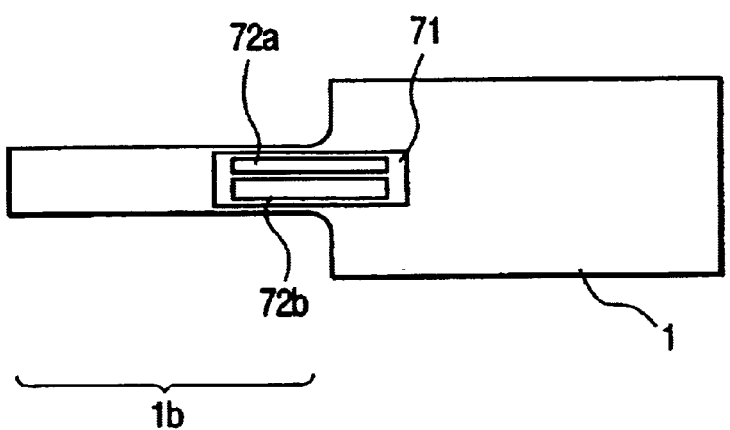

FIGS. 13A and 13B show another probe arrangement in accordance with the present invention. According to this arrangement, two distortion detecting electrodes 72a and 72b are formed on the piezoelectric thin film 71. FIG. 13A is a left side view of the probe 1, while FIG. 13B is a plan view of the same. In FIG. 13A, the probe 1 oscillates in the oscillating direction 7. It is expected that the probe 1 is brought into contact with the measuring object in the sensing direction 73. However, there is a possibility that the probe 1 may be brought into contact with the measuring object in another sensing direction 74. In this case, such an unexpected contact is detectable from the change occurring in the resonant condition. However, it is difficult to discriminate the difference between the sensing directions 73 and 74. To solve this problem, this arrangement uses two distortion detecting electrodes 72a and 72b which are separated from each other. The distortion detecting electrodes 72a and 72b cooperate to detect the twist of the beam portion 1b so as to identify the difference between the sensing directions 73 and 74.

Figure 14:
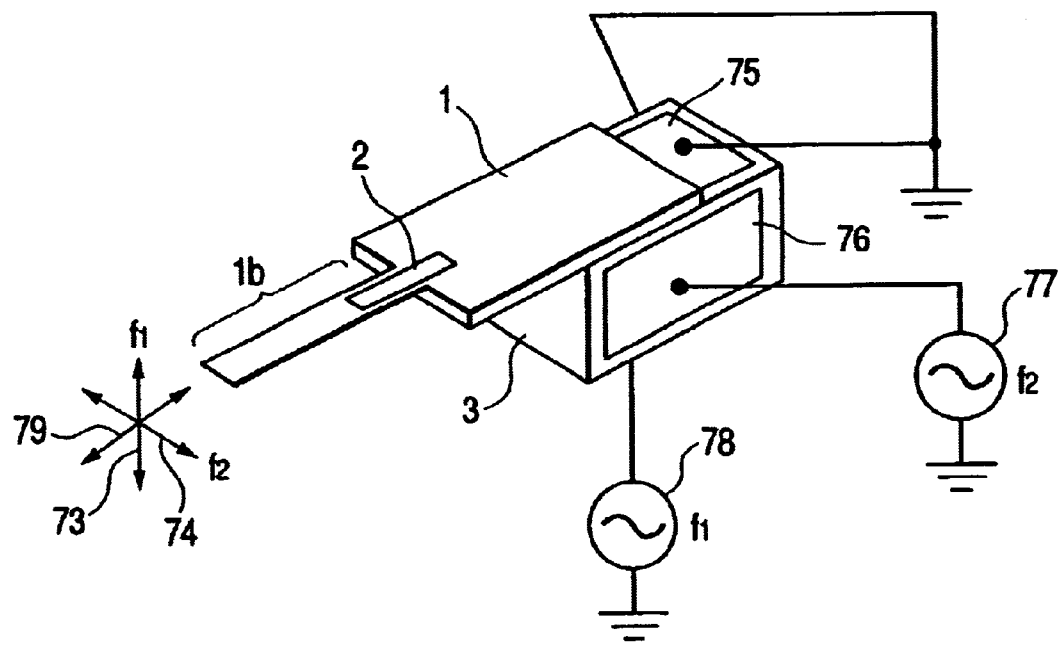
FIG. 14 is a view showing another probe arrangement in accordance with the present invention.
Figure 15:
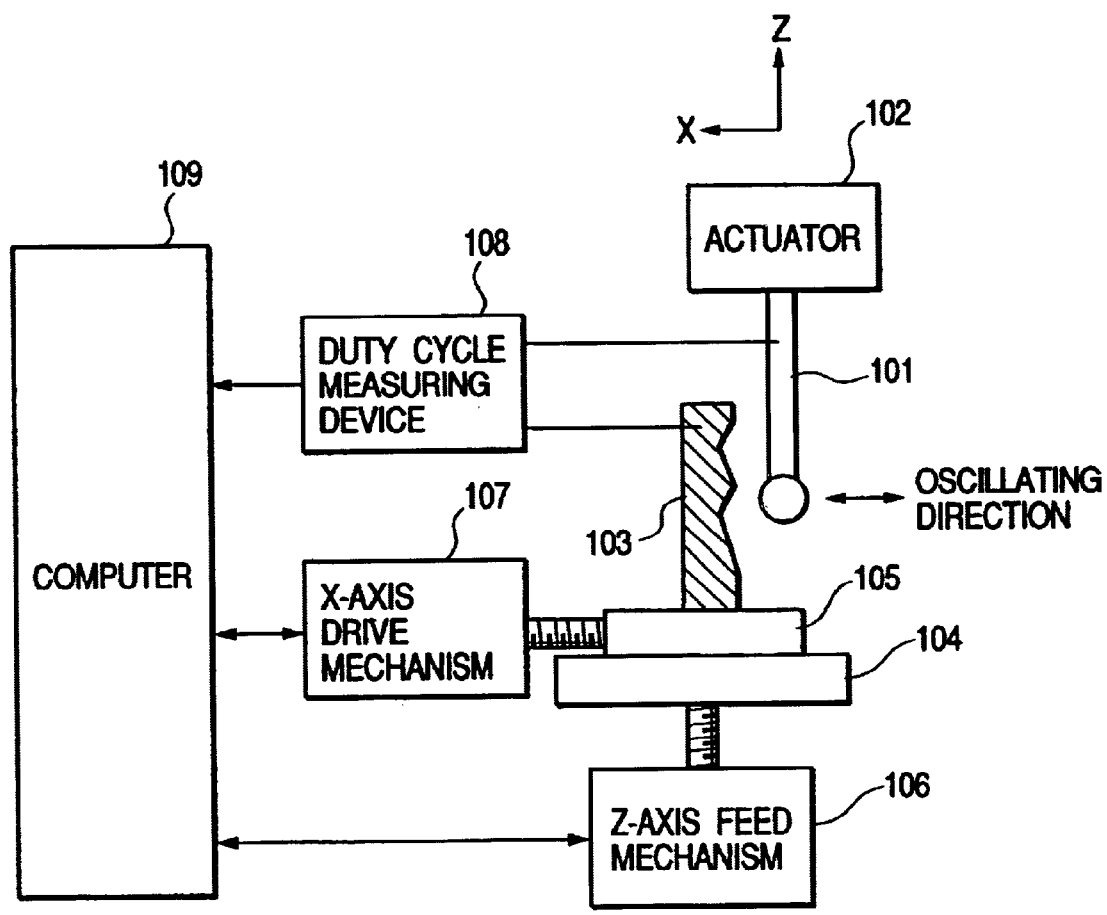
FIG. 15 is a view showing the arrangement of a conventional micro surface configuration measuring apparatus.
Figure 16:
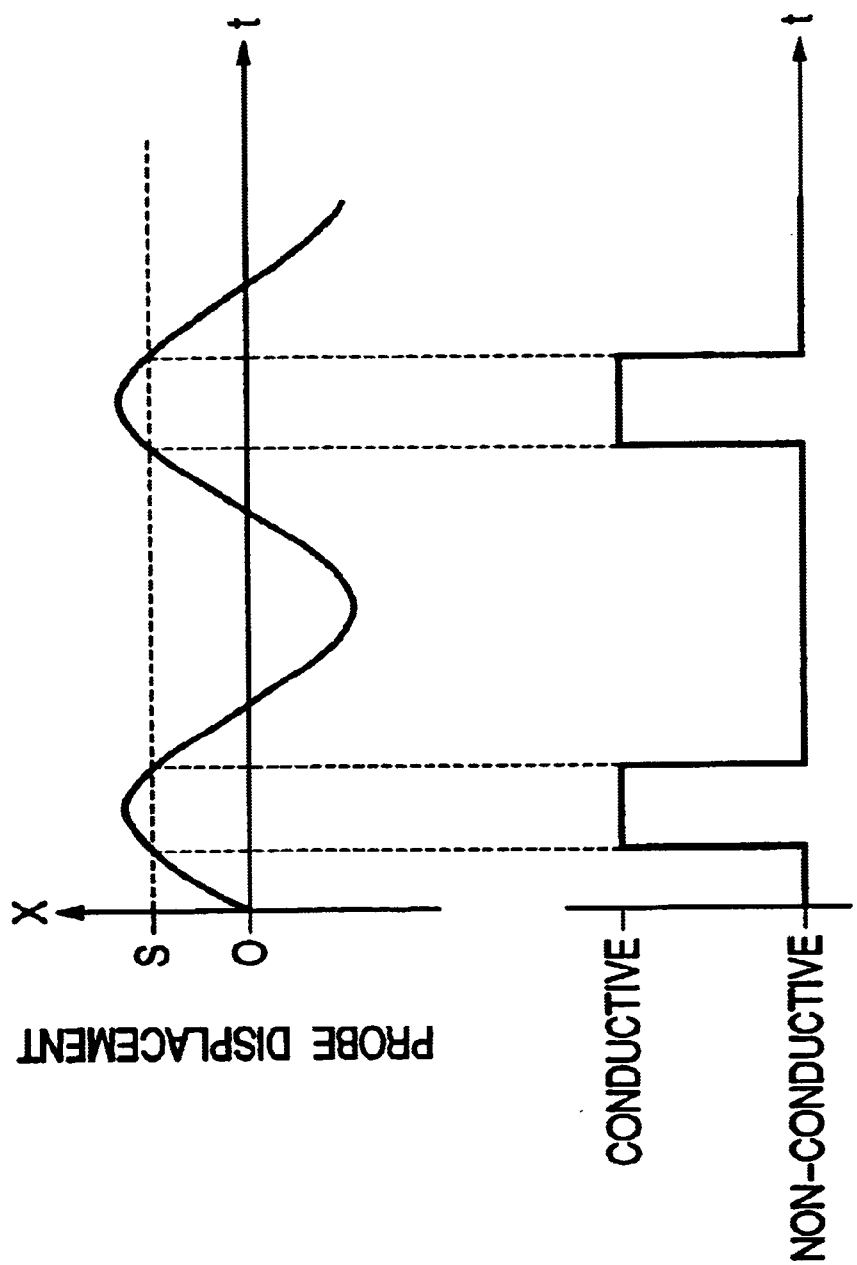
FIGS. 16A and 16B are time charts showing the measuring principle of the conventional micro surface configuration measuring apparatus.
Figure 17:
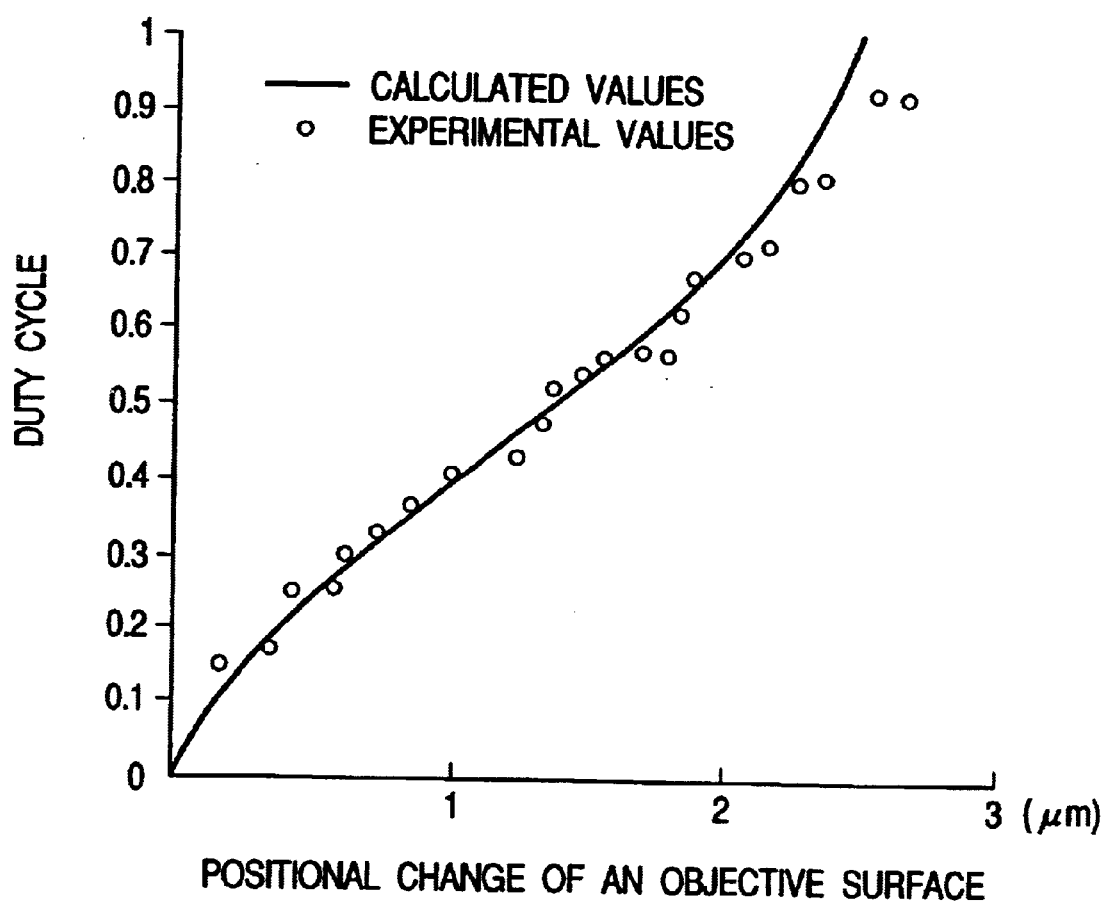
FIG. 17 is a graph showing the relationship between theoretical values and experimental values in accordance with the measuring method of the conventional micro surface configuration measuring apparatus.
Figure 18:
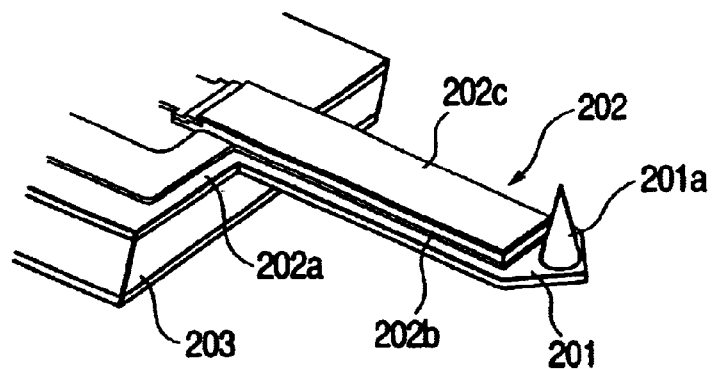
FIG. 18 is a perspective view showing a probe used in the conventional micro surface configuration measuring apparatus.
Figure 19:
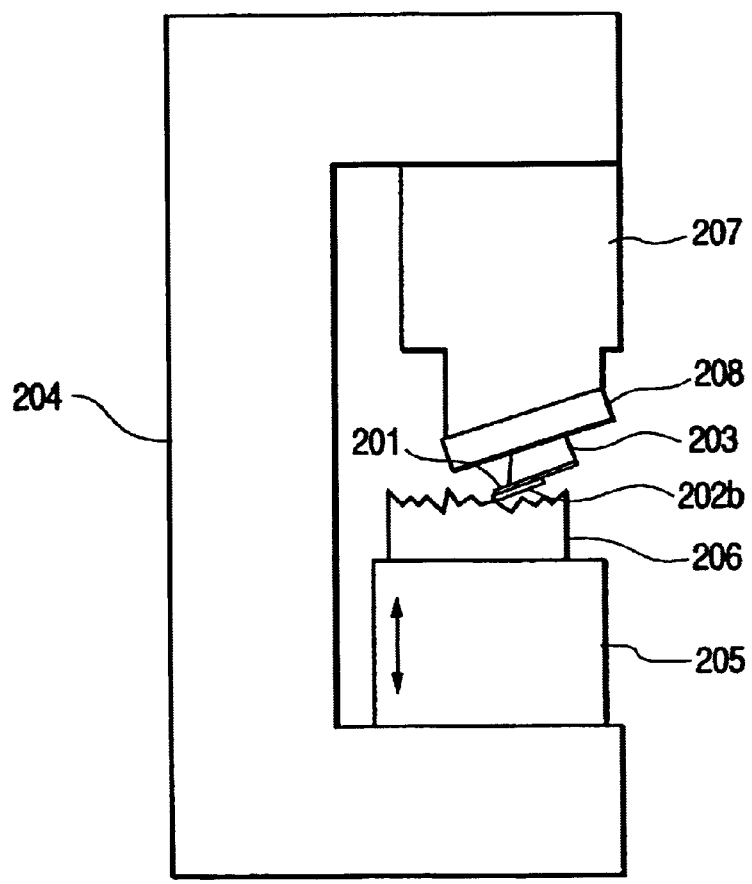
FIG. 19 is a view showing the overall arrangement of the conventional micro surface configuration measuring apparatus.
Figure 20A:
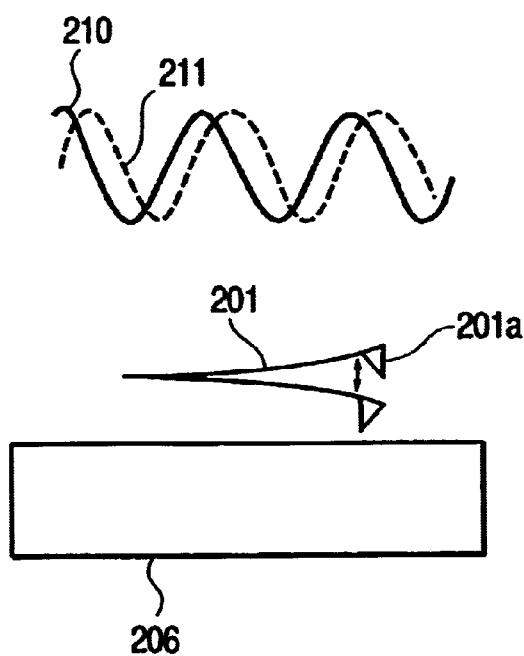
FIGS. 20A and 20B are views illustrating the measuring principle of the conventional micro surface configuration measuring apparatus.
Figure 20B:
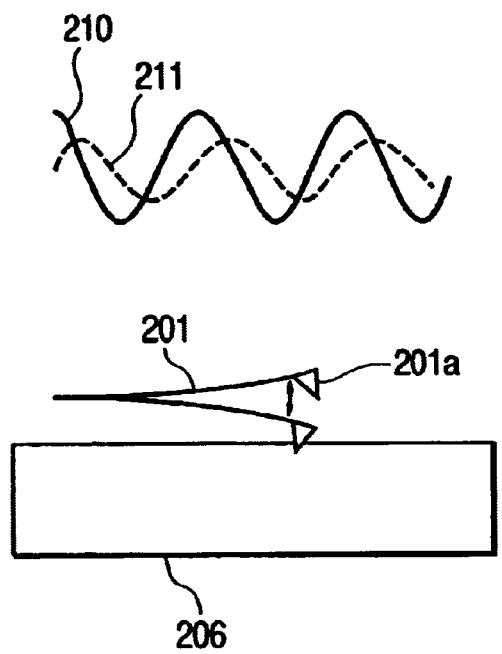

FIG. 14 shows another probe arrangement in accordance with the present invention. According to this arrangement, right-and-left electrodes 76 are provided in addition to upper-and-lower electrodes 75. An oscillator 78 supplies an exciting signal of frequency f1 between the upper-and-lower electrodes 75 to resonate the probe 1 in one sensing direction 73. Another oscillator 77 supplies an exciting signal of frequency f2 between the right-and-left electrodes 76 to resonate the probe 1 in the other sensing direction 74. The thickness and the width of the beam portion 1b are appropriately designed so that the resonance frequency of the beam portion 1b is differentiated in the sensing direction 73 and in the sensing direction 74.

As a result, the distortion detecting signal obtained from the piezoelectric plate 2 is separable into two frequency components which are detected through two orthogonal detectors 49 (not shown) independently as signals representing the contact conditions in the sensing directions 73 and 74. As easily assumed from this arrangement, it is possible to provide additional electrodes on the remaining two surfaces of the piezoelectric element 3. An exciting signal of frequency f3 is applied between these electrodes to oscillate the beam portion 1b in the direction 79. With this arrangement, it becomes possible to independently detect the contact condition in the direction 79.

The above-described probes can be incorporated in the micro surface configuration measuring apparatus explained in the above-described embodiment to measure the configuration of a measuring object.

As apparent from the foregoing description, the present invention provides the probe having a cantilever structure and made of a cemented carbide. The probe has the pointed tip used for measuring the configuration of a measuring object. The piezoelectric element supports this probe and oscillates the probe at or near its resonance frequency. When the pointed tip of the oscillating probe is brought into contact with the objective surface, the amplitude and the oscillatory phase of the probe vary in accordance with the degree of the contact. The piezoelectric plate, provided on the surface of the probe, produces the distortion signal representing the distortion occurring on the probe. The actuator performs the feedback or servo control to adjust the position of the probe in the oscillating direction, thereby stabilizing the oscillatory condition of the probe. While maintaining the stabilized oscillatory condition, the position of the probe with respect to the measuring object is continuously changed by driving the stages and the rotary table. Thus, the probe moves along the undulated surface of the objective surface. As a result, the configuration of the measuring object is measured.

According to this arrangement, it becomes possible to provide a micro surface configuration measuring apparatus capable of stably measuring the objective surface regardless of its conductiveness, not adversely influenced by the oxide film or dusts on the surface, with the probe which is highly resistive in abrasion, highly stable in shape, and highly durable in corrosion.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A micro surface measuring probe having a stepped cantilever structure, comprising:

a pointed tip at its distal end;

a beam portion integrally arranged from said pointed tip; and a proximal portion integrally arranged from said beam portion and supported via a piezoelectric element to a support table so as to be oscillated at or near its resonance frequency by oscillating means, constituted by said piezoelectric element, with a distortion amount detected by distortion detecting means.

2. The micro surface measuring probe in accordance with claim 1, wherein said probe has a pointed tip measuring the configuration of an objective surface, and said pointed tip is made of a conductive member which is high in hardness.

3. The micro surface measuring probe in accordance with claim 1, wherein said probe is made of a cemented carbide.

4. The micro surface measuring probe in accordance with claim 1, wherein said probe is partially or entirely made of a diamond or BN (boron nitride) sintered material.

5. The micro surface measuring probe in accordance with claim 1, wherein said probe is fabricated by a micro electric discharge machining.

6. The micro surface measuring probe in accordance with claim 5, wherein a deteriorated layer formed during said micro electric discharge machining is removed off by using abrasive grain processing.

7. In combination, a micro surface measuring probe having a stepped cantilever structure, oscillating means for oscillating said probe at or near its resonance frequency, and distortion detecting means for detecting a distortion amount of said probe.

* * * * *